April 21, 1925.  
L. N. NETZ ET AL  
FILLING FOR BOXING GLOVES  
Filed April 16, 1923  
1,534,654  
2 Sheets-Sheet 2

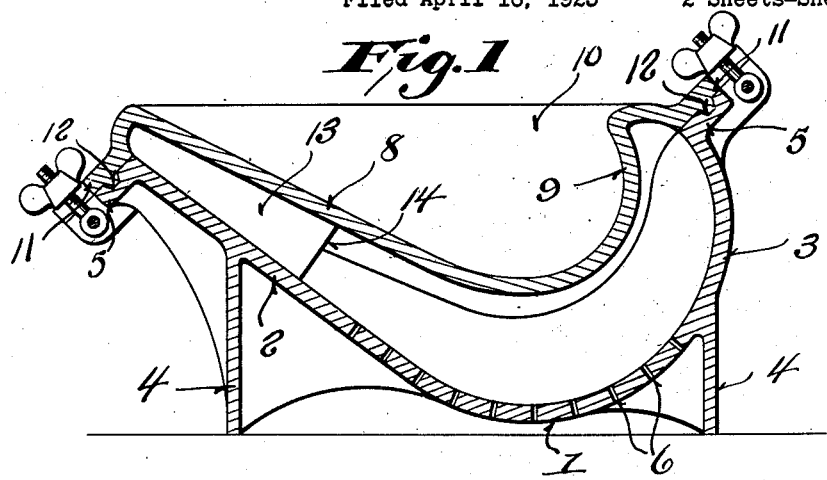

Patented Apr. 21, 1925.

1,534,654

UNITED STATES PATENT OFFICE.

LOUIS N. NETZ AND GEORGE NETZ, OF MILWAUKEE, WISCONSIN, ASSIGNORS TO NETZ GLOVE & MITTEN CO., OF MILWAUKEE, WISCONSIN.

FILLING FOR BOXING GLOVES.

Application filed April 16, 1923. Serial No. 632,377.

*To all whom it may concern:*

Be it known that we, LOUIS N. NETZ and GEORGE NETZ, both citizens of the United States, and residents of Milwaukee, in the county of Milwaukee and State of Wisconsin, have invented certain new and useful Improvements in Fillings for Boxing Gloves; and we do hereby declare that the following is a full, clear, and exact description thereof.

This invention relates to a process of moulding rubber of a type suitable for the padding of boxing gloves and similar articles and to the mould therefor.

Padding for boxing gloves have heretofore been made from sponge rubber by cutting the rubber to shape and cementing the parts together. This process has been found to be expensive and slow, and the resulting product has been only a rough approximation of the article needed. It has been heretofore impossible to form a skin upon the outer surface of the cut sponge rubber and such surface has, therefore, remained porous and open. A further difficulty arose from the inability of the operator to definitely locate the thumb portion with reference to the body portion, as he was compelled to measure and locate its position for each body portion.

This invention is designed to overcome the above noted defects, and objects of such invention are, therefore, to provide a filler for boxing gloves which consists of sponge rubber moulded to the exact contour desired, which is provided with an outer impervious skin, and which is provided with a recessed portion formed in the body portion within which the similarly molded thumb piece is secured.

An embodiment of the invention is shown in the accompanying drawing, in which:

Figure 1 is a longitudinal sectional view through the mould.

Figure 2 is a plan view of the lower portion of the mould.

Figure 3 is a view of the body portion of the padding as it comes from the mould.

Figure 4:
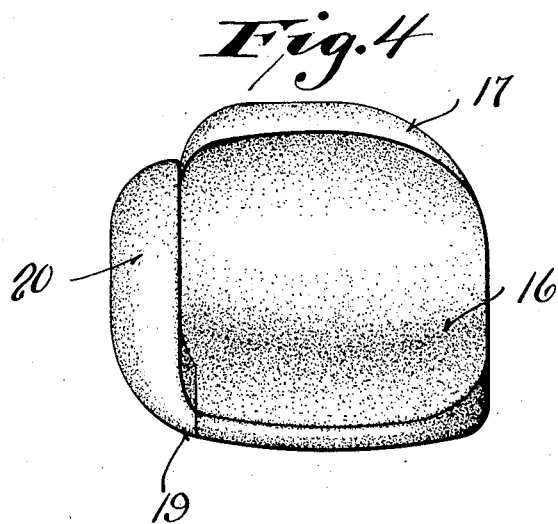
Figure 4 is an end view of the padding showing the thumb piece in position.

In practising the process contemplated by this invention, the raw or green rubber, which is treated so as to change it into sponge rubber during the moulding process is placed within a mould. This material will hereinafter be referred to as "dough" by which term it is usually known in the trade.

The mould within which the dough is placed is so positioned that no portion of the expanded dough has to travel to an excessive height. This is secured by arranging the mould in a slanting position (as shown in Figure 1) so that the terminal portions of the mould are at substantially equal heights. In other words, the general or middle line of the mould is arranged so as to be as nearly horizontal as possible, so that a minimum rise occurs. The mould is then heated at the proper rate and to a temperature sufficient to cause the dough to expand and completely fill the mould and to become cured. In doing this the gases are allowed to escape through suitable perforations, and the material is permitted to completely fill the mould when it is in its expanded position.

During this curing process, the outer surface of the resulting sponge rubber is formed into a skin or substantially impervious outer surface by contacting with the heated walls of the mould. The mould is so shaped that a recessed portion is provided which is adapted to receive the base of the thumb hereinafter described. The mould shown in Figure 1 comprises a lower portion which is downwardly curved as indicated at 1 and which is provided at one side with an upwardly slanting portion 2, and at the other side with an upwardly curving portion 3. Any desired type of support, such as the legs or walls 4 are provided and are joined to the other portion of this bottom member by means of suitable webs as illustrated in Figure 1. The outer ends of this bottom portion are provided with notched lugs 5 whose surfaces are arranged in substantially parallel planes and at an angle to a horizontal line as shown in Figure 1. This bottom portion is provided with a plurality of relatively small apertures 6 to allow for the escaping gases. One side of the bottom portion is provided with an upwardly projecting shoulder 7. The upper portion of the mould, or removable portion, comprises a downwardly slanting part 8 which curves upwardly by means of a gradually rounded arc as indicated at 9. A longitudinally extending strengthening web 10 is provided for this upper portion and joins the parts 8 and 9, and prevents warping or relative motion of such parts. This upper portion terminates in flanges 11, which parallel the flanges or ears 5 of the lower portion and are provided with tongues 12 which fit in the notches of the ears 5. The upper portion is provided with a thickened portion or boss 13 which projects inwardly of the mould and is provided with a shoulder 14 which contacts with the shoulder 7 of the bottom portion. This boss, or thickened portion 13, it will be seen, projects inwardly of the mould and forms the recessed portion 15 (see Figure 3) formed in the body of the padding and constituting a seat for the base of the thumb portion.

The dough is placed in the mould and the mould heated as previously described. After the curing is complete, the upper portion of the mould is readily removed by lifting it upwardly and to the left when the parts are in position (see Figure 1), thereby lifting the tongues 12 from the notched ears 5. It will be noted that the upper portion of the mould lifts straight away from the moulded body part 16 (see Figure 3), and that the tip, upturned, or finger portion 17 of the padding readily draws from the tip of the recess formed in the upper portion as shown in Figure 1. Thereafter, the body portion may be readily removed from the bottom part of the mould by moving such body portion upwardly and to the left when the parts are in the position shown in Figure 1.

Figure 5:
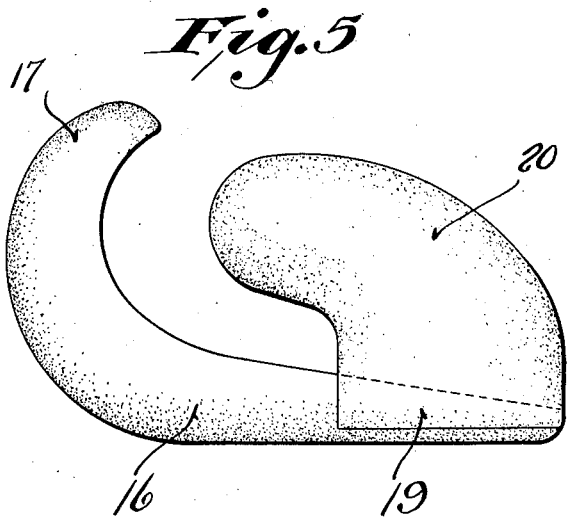
Figure 5 is a side view of the padding.

The resulting body portion 16 (see Figures 3, 4 and 5) is provided with a skin which is substantially impervious and surrounds or encases the porous sponge rubber 18 which results from this process. As previously described, a recessed portion 15 is formed in one side of the body portion and is adapted to receive the base 19 of the thumb portion 20, such thumb portion being produced in a similar manner in a differently shaped mould.

It is to be noted that by forming the recess 15 in the body portion that the operator need not measure the body to locate the position for the base of the thumb portion, but that the thumb portion may be positioned within the recessed portion with its walls contacting with the shoulders or walls of the recessed portion.

It will thus be seen that a process has been provided whereby the treated dough may be readily moulded into the exact contour desired, without requiring any portion thereof to travel to an excessive height in the mould.

It will further be noted that the process results in a sponge rubber body portion which is encased in a skin or enclosing sheath.

It will further be seen that a mould has been produced which may be used in a practical manner to produce perfectly contoured paddings for boxing gloves.

Although the invention has been described in considerable detail as directed to a pad for boxing gloves and to a mould therefor, it is to be understood that other irregularly shaped articles may be produced by this process and that therefore the invention is to be interpreted by the appended claim and the disclosure is to be understood as illustrative rather than limiting.

We claim:

A filling for boxing gloves comprising a body portion formed of molded sponge rubber having a substantially impervious outer skin, and having a recess formed in one of its sides, and a thumb piece formed of molded sponge rubber having a shank adapted to fit within and be positioned by said recess.

In testimony that we claim the foregoing we have hereunto set our hands at Milwaukee, in the county of Milwaukee and State of Wisconsin.

LOUIS N. NETZ.
GEORGE NETZ.